United States Patent

Texier

(10) Patent No.: US 9,961,658 B2
(45) Date of Patent: May 1, 2018

(54) LOCAL NETWORK FOR THE SIMULTANEOUS EXCHANGE OF DATA BETWEEN A DRONE AND A PLURALITY OF USER TERMINALS

(71) Applicant: PARROT DRONES, Paris (FR)

(72) Inventor: Nicolas Texier, Paris (FR)

(73) Assignee: PARROT DRONES, Paris (FR)

( * ) Notice: Subject to any disclaimer, the term of this patent is extended or adjusted under 35 U.S.C. 154(b) by 0 days. days.

(21) Appl. No.: 15/632,250

(22) Filed: Jun. 23, 2017

(65) Prior Publication Data

US 2017/0374636 A1 Dec. 28, 2017

(30) Foreign Application Priority Data

Jun. 23, 2016 (FR) .................................. 16 55838

(51) Int. Cl.
*H04W 60/00* (2009.01)
*H04B 7/185* (2006.01)
*H04W 76/02* (2009.01)
*H04N 7/18* (2006.01)
*G06K 9/00* (2006.01)
*G05D 1/00* (2006.01)
(Continued)

(52) U.S. Cl.
CPC ........ H04W 60/005 (2013.01); G05D 1/0022 (2013.01); G05D 1/0038 (2013.01); G06K 9/0063 (2013.01); H04B 7/18506 (2013.01); H04N 7/185 (2013.01); H04W 76/023 (2013.01); H04W 84/12 (2013.01); H04W 84/20 (2013.01)

(58) Field of Classification Search
CPC ....................... B64C 39/024; B64C 2201/146; H04N 7/185; H04W 4/02

USPC .................... 455/435.1, 556.1, 574; 307/104
See application file for complete search history.

(56) References Cited

U.S. PATENT DOCUMENTS

2011/0181683 A1 7/2011 Nam
2015/0298822 A1 10/2015 Eline
(Continued)

FOREIGN PATENT DOCUMENTS

WO WO2016032968 3/2016

OTHER PUBLICATIONS

Arjuna Sathiaseelan, et al., "Clouddrone: Micro Clouds in the Sky," arxiv.org, Cornell Univ. Library, Ithaca, NY, Apr. 27, 2016.

*Primary Examiner* — Sam Bhattacharya
(74) *Attorney, Agent, or Firm* — Steven M. Greenberg, Esq.; CRGO Law

(57) ABSTRACT

A primary user terminal is interfaced with the drone so as to constitute a local network of the infrastructure type, where the drone is configured as an access point (AP) and the primary user terminal is configured as a mobile station. The primary user terminal comprises an adaptive software program able i) to generate piloting and control instructions to be transmitted to the drone, and ii) to establish a connection to the local network and to register the primary user terminal into a registration table of the drone. The network further comprises at least one secondary user terminal with an applicative software program adapted to establish a connection to the local network and to register the secondary user terminal into the registration table of the drone with a hierarchized management of the rights with respect to the primary terminal.

9 Claims, 2 Drawing Sheets

(51) Int. Cl.
*H04W 84/12* (2009.01)
*H04W 84/20* (2009.01)

(56) References Cited

U.S. PATENT DOCUMENTS

| | | |
|---|---|---|
| 2016/0136482 A1 | 5/2016 | Askew, Jr. et al. |
| 2016/0364823 A1* | 12/2016 | Cao .................... G06Q 10/1095 |
| 2017/0013476 A1* | 1/2017 | Suthar .................... H04W 24/02 |
| 2017/0068424 A1* | 3/2017 | Hong .................. G06F 3/04842 |
| 2017/0235308 A1* | 8/2017 | Gordon ................ G05D 1/0088 |

* cited by examiner

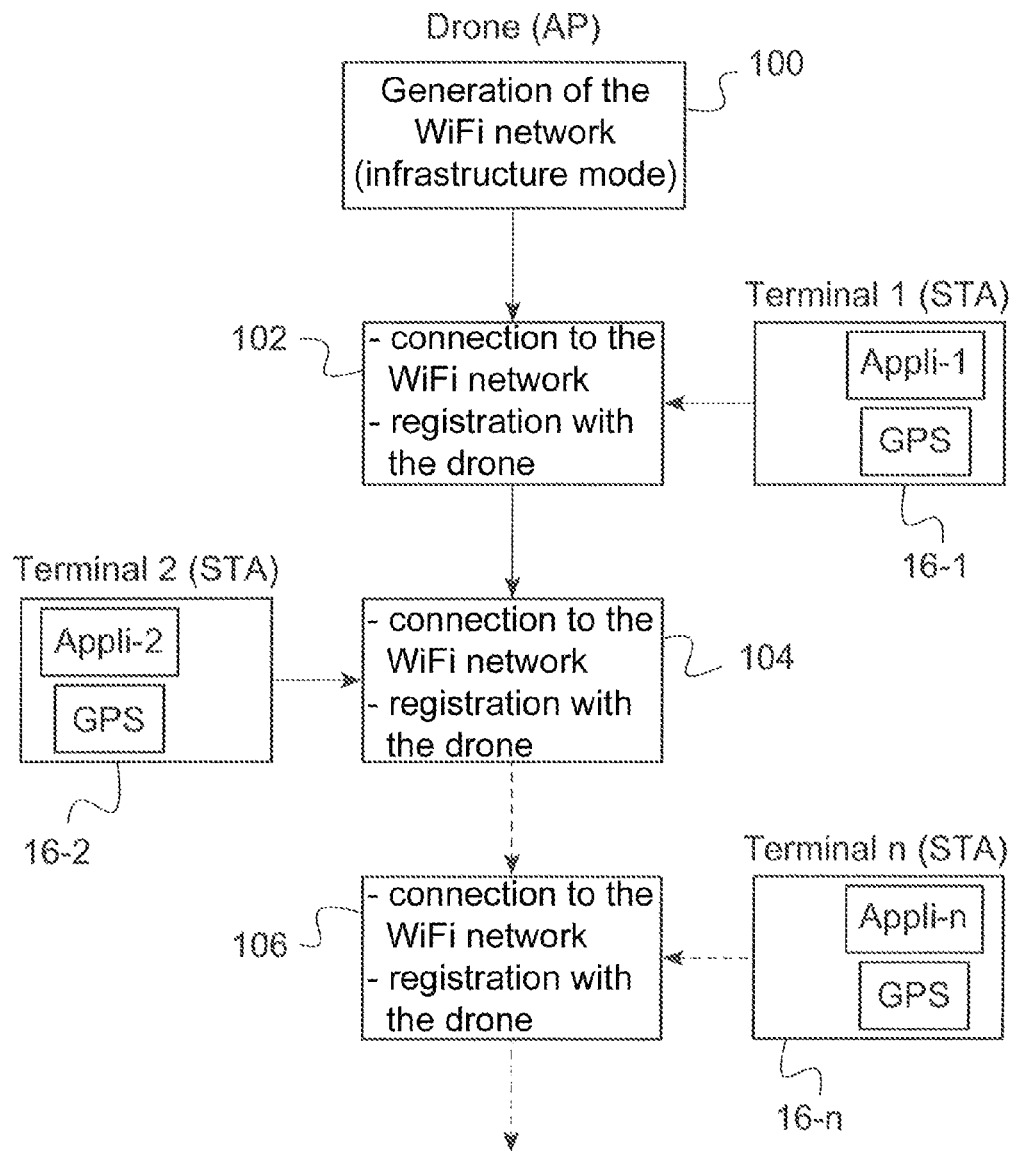

LOCAL NETWORK FOR THE SIMULTANEOUS EXCHANGE OF DATA BETWEEN A DRONE AND A PLURALITY OF USER TERMINALS

CROSS REFERENCE TO RELATED APPLICATIONS

This application claims priority under 35 U.S.C. § 119(a) to French Patent Application Serial Number 165838, filed Jun. 23, 2016, the entire teachings of which are incorporated herein by reference.

BACKGROUND OF THE INVENTION

Field of the Invention

The invention relates to video shootings operated from motorized flying devices such as drones.

Description of the Related Art

A typical example of flying drone is the Bebop of Parrot SA, Paris, France, which is a rotary-wing drone of the quadricopter type. Such drones are equipped with a series of sensors (accelerometers, three-axis gyrometers, altimeter, etc.) and a front camera capturing an image of the scene towards which the drone is directed. They may advantageously be piloted by means of a touch-screen multimedia telephone or tablet having integrated accelerometers, for example a smartphone of the iPhone type or a tablet of the iPad type (registered trademarks), with possibility to remote transmit the images captured by the front camera of the drone in order to visualize them, in real time, on the screen of this remote-control apparatus held by the user. It is a standard apparatus, not modified except the loading of an applicative software program such as the mobile application Freeflight (registered trademark) of Parrot SA to control the piloting of the drone and the visualization of the images taken by the on-board front camera.

Patent Cooperation Treaty Published Application WO 2010/061099 A2 and European Patent Applications EP 2 364 757 A1, EP 2 613 213 A1, EP 2 450 862 A1 or EP 2 613 214 A1 each describe various aspects of these drones and of the way to remotely pilot them.

The remote control incorporates the various elements required for the detection of the drone piloting and control instructions and for the bidirectional exchange of data via a radio link of the WiFi (IEEE 802.11) or Bluetooth wireless local network type directly established with the drone. Its touch screen displays the image captured by the front camera of the drone, with, in superimposition, a certain number of symbols allowing the control of the flight and the activation of commands by simple contact of the operator's finger on this touch screen.

More precisely, the bidirectional wireless radio link comprises an uplink (from the tablet to the drone) and a downlink (from the drone to the tablet) to transmit data frames containing:

(from the tablet to the drone) the piloting and control instructions, sent at regular intervals and on a systematic basis, as well as various pieces of information or parameters, intended for the drone;

(from the drone to the tablet) the video stream coming from the camera; and (from the drone to the tablet) as needed, flight data established by the drone or state indicators such as: battery level, phase of flight (takeoff, automatic stabilization, landed on the ground, etc.), altitude, detected fault, etc.

The front video camera (or "horizontal camera") can not only be used for a piloting in "immersive mode", i.e. where the user uses the image from the camera in the same way as if he were himself on board the drone, but it may also serve to capture sequences of images of a scene viewed from the drone. The user may then use the drone in the same way as a camera or a camcorder that, instead of being held in hand, would be borne by the drone. The images collected can be recorded, then broadcast, put online on web sites for hosting video sequences, sent to other Internet users, shared on social networks, etc.

This camera may be a steerable camera, in order to direct in a controlled manner in a predetermined direction the sight axis, and hence the field of the images transmitted with the video stream.

A first technique, implemented in particular in the above-mentioned Bebop apparatus and described in the European Patent Application EP 2 933 775 A1, consists in providing as a front camera a high-definition wide-angle camera provided with a hemispherical-field lens of the fisheye type covering a field of about 180°. The raw image delivered by this sensor is windowed in real time by a software processing, operated by a processor of the drone, ensuring the selection of the useful pixels of the raw image in a determined capture zone as a function of a certain number of parameters. These parameters include data delivered by the inertial unit (to ensure a stabilization of the image that compensates for the oscillations and vibrations of the drone), as well as various commands of pointing towards a particular target chosen by the user or automatically followed by the drone.

As a variant, or even as a complement, of the control of the camera sight axis by a windowing software program, it is also possible to mount the camera on a three-axis articulated support of the gimbal type with Cardan suspension, provided with servomotors piloted as a function of the gyrometer data and of the pointing commands.

These techniques allow in particular a use according to a so-called "follow-me" mode, where the user moves (on skis, on a bike . . . ) and programs the drone so that the latter accompanies him automatically in his displacement, keeping the camera pointed on him. The video stream delivered by the camera hence shows the user at the centre of the image, moving in his environment, the user being the spectator of his own movements. This follow-me image may then be stored, broadcast on the social networks, etc.

In practical terms, to ensure the follow-up of the user (the tracking target) by the camera, various techniques are combined, including a processing of the video stream collected by the camera (movement detection and target tracking) and the processing of geographical location data of the target, typically by a GPS beacon or tracker carried by the user and whose data are transmitted to the drone via the bidirectional data link. Indeed, the processing of the video stream intended to ensure the framing of the target is liable to be mistaken and to mix up the real target (the user) with an element of the environment, such as another person or an object with similar colours, for example. To counter this undesirable effect, the tracking system users in addition target location data, in order to link an element viewed on the screen with the indications of the GPS tracker carried by the target, with possibly a management of the priorities in case of difference between the video tracking information and the location data.

This operating mode corresponds to a generally narcissistic use of the functionality, where the primary user is the targeted person, that hold the GPS tracker.

The object of the present invention is to propose an extension of this operating mode, opening to social functionalities.

The matter is to involve several persons in the follow-me mode, in scenarios such as a family walk or climbing with friends, during which it is desired to capture souvenir images by means of a drone, taking into account the presence of the different persons present in addition to the primary user to manage the presence of these other users present, for example by shifting the framing of the windowing software program so that the latter shows not only the primary user, but also the other persons with which the latter moves.

A paper by A Sathiaseelan et al., *Cloudrone: Micro Clouds in The Sky*, Cornell University Library, 201 Olin Library Cornell University, Ithaca, N.Y. 14853, 27 Apr. 2016, describes an implementation of low-cost WiFi network operated from a flying drone allowing the provision of an Internet access infrastructure in disadvantages regions. The drone is piloted via this same WiFi network, and from the network point of view, it acts as an Access Point, AP, within the meaning of the WiFi specifications, the users being all served indifferently from this access point.

The technical problem, in the case of the present invention, lies in the management of the connections of several terminals (that of the primary user and those of the other users present with him), with a suitable interpretation of the data exchanged with the drone to avoid that the drone receives contradictory commands from several terminals that are simultaneously connected with it.

SUMMARY OF THE INVENTION

An aspect of the invention consists in establishing a hierarchized local network from a common access point corresponding to the drone, forming a concentration end point (for example, an access point AP within the meaning of the network) and from which several user terminals will be able to connect (each terminal being for example configured as a mobile station STA within the network meaning). At the time of their connection to the network, the different terminals will register with the primary program of the drone, which constitutes a compulsory point of passage and which will manage the priorities and right levels allocated to the different users, so as to avoid any contradiction, in particular in the piloting instructions received by the drone.

More precisely, the invention proposes for that purpose a local network of the general type disclosed in particular in the documents referred hereinabove as well as in the above mentioned paper of Sathiaseelan et al., i.e. a network allowing the exchange of data between a drone and a plurality of similar user terminals liable to establish successively, in an undifferentiated manner, a connection to the local network and to be registered into a registration table of the drone, said data comprising drone piloting and control instructions and/or a video stream.

In this known network, the drone includes piloting circuits operating as a function of said piloting and control instructions; an on-board video camera delivering the video stream; and a wireless emitter/receiver; and a network management software program comprising said table for the registration of remote terminal(s).

Characteristically of the invention, this local network is a hierarchized network between:

a primary user terminal having rights allowing it to send piloting and control instructions to the drone, and comprising:
   a wireless emitter/receiver interfaced with the emitter/receiver of the drone;
   a network management software program; and
   an applicative software program able i) to generate said piloting and control instructions to be transmitted to the drone, and ii) to control the network management software program to establish a connection to the local network and to register the primary user terminal into the registration table of the drone, and
at least one passive, secondary user terminal, comprising:
   a wireless emitter/receiver interfaced with the emitter/receiver of the drone;
   a network management software program; and
   an applicative software program able to control the network management software program to establish a connection to the local network and to register the secondary user terminal into the registration table of the drone.

Moreover, the network includes designation means, able to designate as the primary user terminal one of said similar user terminals, and as secondary user terminals all the other similar user terminals.

According to various advantageous, subsidiary features:
   the network is a local network of the infrastructure type, where the drone is configured as an access point and the primary user terminal and the at least one secondary user terminal are configured as mobile stations, the network management software program of the drone being a network access point software program, and the respective management software programs of the primary user terminal and of the at least one secondary user terminal being network mobile station management software programs;
   the local network is a non-modified WiFi network of the infrastructure type according to IEEE 802.11;
   the applicative software program of the secondary user terminal is an applicative software program unable to generate piloting and control instructions to be transmitted to the drone;
   the primary user terminal and/or the secondary user terminal are able to generate terminal sensor information to be transmitted to the drone, in particular information of geolocation of the terminal in a terrestrial reference system.

The above-mentioned designation means may be:
   means implemented by the network access point management software program of the drone;
   means able to designate as the primary user terminal the user terminal that, chronologically, first connects to the local network and is registered into the registration table of the drone;
   means able to recognize a user terminal whose applicative software program is a specific applicative software program, different from the applicative software programs of the other user terminals, and to designate this user terminal as the primary user terminal;
   means able to recognize a user terminal associated with a predetermined user-specific identifier, or with a predetermined terminal-specific identifier, and to designate as the primary user terminal the so-recognized user terminal.

BRIEF DESCRIPTION OF THE DRAWINGS

An example of implementation of the present invention will be now described, with reference to the appended drawings in which the same references designate throughout the figures identical or functionally similar elements.

FIG. 3 is a flow diagram showing the sequence of successive steps of connection of the terminals to the drone network, and their registration with the primary program of the latter.

DETAILED DESCRIPTION OF THE EMBODIMENTS OF THE INVENTION

An exemplary embodiment of the invention will now be described.

Figure 1:
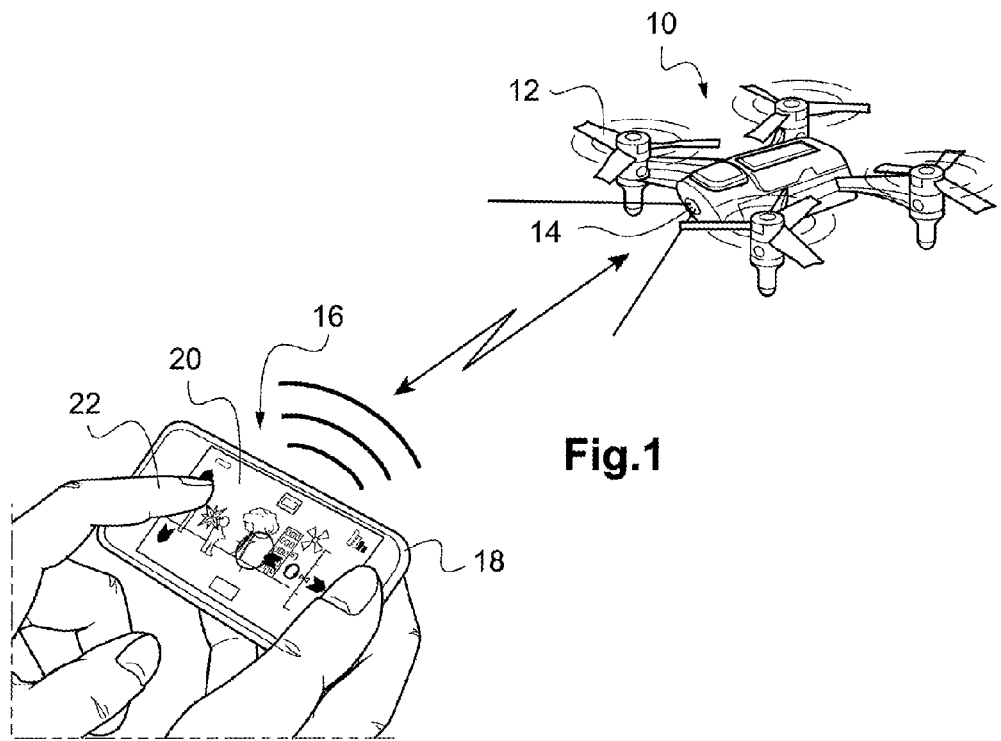
FIG. 1 is an overall view showing a drone piloted by a remote-control apparatus.

In FIG. 1, the reference 10 generally denotes a drone, which is for example a quadricopter such as the Bebop of Parrot SA. This drone includes four coplanar rotors 12 whose motors are piloted independently by an integrated navigation and attitude control system. It is provided with a front-view camera 14 allowing obtaining an image of the scene towards which the drone is directed, for example a high-definition wide-angle camera provided with a hemispherical-field lens of the fisheye type covering a field of about 180° forming a raw image on a sensor of 14 Mpixel (4608×3288 pixels) resolution, then windowed in real time on a HD image (1920×1080 pixels, i.e. 2 Mpixel), with a refreshing rate of the video stream of 30 fps (frames per second).

The drone 10 is piloted by a remote-control apparatus 16, hereinafter "terminal", such as a touch-screen multimedia telephone or tablet having integrated accelerometers, for example a smartphone of the iPhone type (registered trademark) or else, or a tablet of the iPad type (registered trademark) or else.

It is a standard apparatus, not modified except the loading of an applicative software program such as the mobile application Freeflight (registered trademark) to control the piloting of the drone 10 and the visualization of the images taken by the on-board front camera 14.

The terminal 16 comprises a body 18 and a touch screen 20 displaying the image of the scene captured by the front camera 14, with, in superimposition, a certain number of symbols allowing the activation of piloting instructions (up/down, etc.) by simple contact of a finger 22 of the user on the symbols displayed on the screen. The terminal 16 is also provided with inclination sensors allowing controlling the drone attitude by imparting to the apparatus corresponding inclinations about roll and pitch axes to make it move forward or rearward. The actions of the user are interpreted by the applicative software program, which transforms them into piloting instructions for the drone. The telephone or the tablet may possibly be relayed by a specific remote-control device such as the Skycontroller of Parrot SA, that is a console interfaced with the telephone or the tablet in the form of a box provided with two handles with joysticks and various buttons for an ergonomic piloting by the user in the same way as a dedicated remote-control consol.

The data communication link between the drone 10 and the terminal 16 is very advantageously a link of the standard WiFi type (IEEE 802.11n) of the dual-band (2.4 GHz/5 GHz) type, configured so as to form between the drone 10 and the terminal 16 a local network of the hierarchized, infrastructure type, where the drone operates in access point (AP) mode, i.e. in master mode for the network, and the terminal 16 in mobile station (STA) mode, i.e. in slave mode under the control of the drone.

The local network is generated from the drone, which incorporates a network management software program comprising in particular a table for the registration of the mobile stations liable to be connected to the latter.

The WiFi network implemented is advantageously a non-modified standard network, which allows benefiting from the multiple functionalities of the WiFi specification: protection against the collisions, encapsulation of the data, management of the accesses to the network, encryption and authentication, management of the frequency plane, etc.

In a conventional follow-me operating mode, the drone is piloted automatically so as to ensure the tracking of single user, this user being the target tracked by the drone in his movements and also towards which the camera points, whether it is a software pointing by a windowing processing or a camera mounted on an steerable nacelle of the gimbal type, whose mechanical movement is controlled by the servomotors.

Within the context of the invention, the matter is to allow other users ("secondary users") to also connect to the WiFi network of the drone, in addition to the user ("primary user") connected to the drone and having rights allowing him to the send piloting and control instructions to the latter. On the other hand, to avoid any conflict, the secondary users won't be able to send piloting instructions to the drone to avoid that the latter receive contradictory commands coming from several terminals that are simultaneously connected to it.

Figure 2:
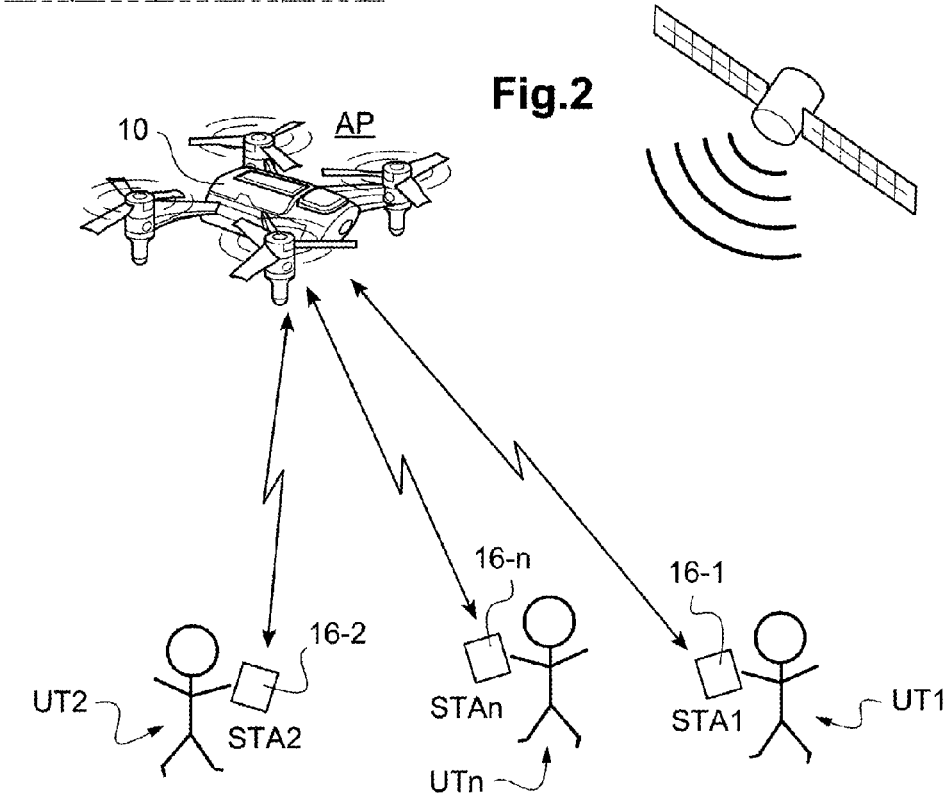
FIG. 2 is a schematic view showing a plurality of users each having their terminal connected to the drone.

In FIG. 2, the primary user, which has a terminal 16-1, for example a smartphone stored in a pocket, is denoted UT1.

The secondary users UT2, . . . UTn each have, in the same way, a terminal 16-2, . . . 16-$n$ allowing the identification thereof on the local WiFi network managed by the drone.

The terminals of the different users UT1, UT2, . . . UTn, are all terminals configured as mobile stations STA1, STA2 . . . STAn, connected by a radio link to the drone 10, configured as an access point AP acting as a concentrator for the different terminals of the network users.

FIG. 3 illustrates the successive steps implemented during the constitution of the multi-user network.

The local WiFi network is established from the drone, in infrastructure mode (block 100), the latter acting as a concentrator for the different mobile stations of the network.

The following step (block 102) consists in establishing a connection by a first terminal (herein the primary user terminal 16-1), which detects and selects the WiFi network generated by the drone, according to a standard protocol of connection to the WiFi infrastructure. Once the connection established, the terminal registers with the primary network management program of the drone, which will then allow piloting the latter in follow-me mode and suitably steering the camera.

The terminal advantageously includes, in addition to the applicative software program Appli-1, a GPS geolocation module for generating GPS sensor information to be transmitted to the drone to allow a geolocation of the terminal as a target. The terminal held by the user hence acts as a tracker, whose information will be used in the drone as a complement of the target movement detection video processing to ensure the framing and the follow-up of the target peculiar to the follow-me function.

In a latter step (block 104), a second terminal, denoted 16-2, held by another user, establishes a connection to the WiFi network and also registers with the primary program of the drone. Once these operations performed, this second terminal will be able, as the first one, to generate GPS sensor information transmitted to the drone, for example to allow the drone to lock thereto, to shift the image so that the two users are visible together on the latter, etc.

The operation of connection to the WiFi network and of registration with the drone may be repeated (block 106) in the same way, for other users.

If several terminals are hence connected to the drone, it is necessary to establish priorities between the data sent to the drone, to avoid conflicts of drone piloting and control instructions.

For that purpose, two right levels are defined:

a primary level, reserved to the primary user: it has the ability to send piloting and control instructions to the drone, for example to trigger the automatic follow-me mode or, conversely, to take back the control for a controlled piloting of the drone. Only one user will be able to be connected at this right level (the primary user); and a secondary level, for all the other users. These users will be passive users, i.e., although they do not have the faculty to send piloting commands to the drone, they will nevertheless remain connected to the network, with the possibility to receive the video stream from the camera of the drone, and/or to send sensor information to the drone to allow the latter to lock thereto, for example GPS sensor information allowing controlling the steering of the drone and/or the framing at the shooting so that all the users, primary and secondary, are included in the field of the camera.

The management of these two right levels may be operated in various manners.

A first implementation consists in loading different applicative software programs in the terminals, for the primary level and the secondary level, respectively.

Another possible implementation consists, independently of the applicative software program, to allocate rights on the "first arrived/first served" basis, the first terminal connecting to the network of the drone being considered as being the one which has the primary level, the following ones having only the secondary level.

Another possible embodiment consists in allocating the primary level to a particular terminal, recognized by the network from a specific identifier recognized as "proprietary" (for example, an identifier in a remote cloud server with which the user is registered, or an identifier specific to the user terminal), hence having by default the primary level.

These different strategies may be applied in a complementary manner, for example i) by providing, in addition to the applicative software program usually used for the piloting of the drone, a second applicative software program dedicated to the follow-me function, as a secondary follow-up, with restricted piloting functions, giving only access to the secondary levels of the rights, and concurrently, ii) allowing the connection of only one applicative software program at the primary level, on the first arrived/first served basis.

Another combined application consists in i) providing a single applicative software program, the same for all the terminals, but ii) allocating the rights of the primary level by order of preference only either to a predetermined user terminal recognized by a specific identifier (for example an identifier in a remote cloud server with which the user is registered), or, failing that, to the first terminal connecting to the network.

What is claimed is:

1. A local network for the exchange of data between a drone and a plurality of similar user terminals able to establish successively, in an undifferentiated manner, a connection to the local network and to be registered into a registration table of the drone, said data comprising drone piloting and control instructions and/or a video stream, network, wherein:

the drone comprises:
piloting circuits operating as a function of said piloting and control instructions;
an on-board video camera delivering the video stream;
a wireless emitter/receiver; and
a network management software program comprising said table for the registration of one or more remote terminals, the local network is a hierarchized network between:
a primary user terminal having rights allowing it to send piloting and control instructions to the drone, and comprising:
a wireless emitter/receiver interfaced with the emitter/receiver of the drone;
a network management software program; and
an applicative software program able i) to generate said piloting and control instructions to be transmitted to the drone, and ii) to control the network management software program to establish a connection to the local network and to register the primary user terminal into the registration table of the drone, and
at least one passive, secondary user terminal, comprising:
a wireless emitter/receiver interfaced with the emitter/receiver of the drone;
a network management software program; and
an applicative software program able to control the network management software program to establish a connection to the local network and to register the secondary user terminal into the registration table of the drone,
and in that the network includes designation means implemented by the network access point management software program of the drone, able to designate as the primary user terminal one of said similar user terminals, and as secondary user terminals all the other similar user terminals.

2. The local network of claim 1, wherein the network is a local network of an infrastructure type, where the drone is configured as an access point and the primary user terminal and the at least one secondary user terminal are configured as mobile stations, the network management software program of the drone being a network access point software program, and the respective management software programs of the primary user terminal and of the at least one secondary user terminal being network mobile station management software programs.

3. The network of claim 2, wherein the local network is a non-modified WiFi network of the infrastructure type according to IEEE 802.11.

4. The local network of claim 1, wherein the applicative software program of the secondary user terminal is an applicative software program unable to generate piloting and control instructions to be transmitted to the drone.

5. The local network of claim 1, wherein the primary user terminal and/or the secondary user terminal are able to generate terminal sensor (GPS) information to be transmitted to the drone.

6. The local network of claim 5, wherein said terminal sensor (GPS) information comprises a geolocation of the terminal in a terrestrial reference system.

7. The local network of claim 1, wherein the designation means are means able to designate as the primary user terminal the user terminal that, chronologically, first connects to the local network and is registered into the registration table of the drone.

8. The local network of claim 1, wherein the designation means are means able to recognize a user terminal whose applicative software program is a specific applicative software program, different from the applicative software programs of the other user terminals, and to designate this user terminal as a primary user terminal.

9. The local network of claim 1, wherein the designation means are means able to recognize a user terminal associated with a predetermined user-specific identifier, or with a predetermined terminal-specific identifier, and to designate as the primary user terminal the so-recognized user terminal.

\* \* \* \* \*